(12) United States Patent
Fullerton et al.

(10) Patent No.: US 9,556,034 B2
(45) Date of Patent: Jan. 31, 2017

(54) SYSTEM FOR PRODUCING GRAPHENE IN A MAGNETIC FIELD

(71) Applicant: Cedar Ridge Research, LLC, New Hope, AL (US)

(72) Inventors: Larry W. Fullerton, New Hope, AL (US); Mark D. Roberts, Huntsville, AL (US)

(73) Assignee: Cedar Ridge Research, LLC, New Hope, AL (US)

( * ) Notice: Subject to any disclaimer, the term of this patent is extended or adjusted under 35 U.S.C. 154(b) by 0 days.

(21) Appl. No.: 14/876,568

(22) Filed: Oct. 6, 2015

(65) Prior Publication Data

US 2016/0023909 A1    Jan. 28, 2016

Related U.S. Application Data

(63) Continuation-in-part of application No. 14/799,676, filed on Jul. 15, 2015, now Pat. No. 9,334,168, which is a continuation-in-part of application No. 14/275,267, filed on May 12, 2014, now Pat. No. 9,212,063, which is a continuation-in-part of
(Continued)

(51) Int. Cl.
| | |
|---|---|
| *C01B 31/04* | (2006.01) |
| *B01J 19/08* | (2006.01) |
| *B01J 37/34* | (2006.01) |
| *B82Y 30/00* | (2011.01) |
| *B82Y 40/00* | (2011.01) |

(52) U.S. Cl.
CPC .......... *C01B 31/0446* (2013.01); *B01J 19/087* (2013.01); *B01J 19/088* (2013.01); *B01J 37/342* (2013.01); *B82Y 30/00* (2013.01); *B82Y 40/00* (2013.01); *B01J 2219/0801* (2013.01); *B01J 2219/0852* (2013.01); *B01J 2219/0854* (2013.01); *B01J 2219/0862* (2013.01); *B01J 2219/0875* (2013.01); *B01J 2219/0886* (2013.01); *B01J 2219/0892* (2013.01); *B01J 2219/0896* (2013.01)

(58) Field of Classification Search
CPC .... C01B 31/0446; B01J 19/087; B01J 19/088; B01J 37/342; B01J 2219/0862; B01J 2219/0852; B01J 2219/0854; B01J 2219/0886; B01J 2219/0875; B01J 2219/0892; B01J 2219/0896; B82Y 30/00; B82Y 40/00
See application file for complete search history.

*Primary Examiner* — Kishor Mayekar
(74) *Attorney, Agent, or Firm* — Vector IP Law Group; Robert S. Babayi

(57) ABSTRACT

An improved system for generating graphene involves a liquid reaction chamber configured to receive a working liquid source, a carbon atom source, and a catalyst to cause a chemical reaction in the reaction chamber and a resulting reactant liquid comprising ring structures having starved carbon atoms. The ring structures are provided to a graphene generation chamber having a magnetic structure that includes a two-dimensional array of alternating polarity magnetic sources that produce a magnetic field having a gradient sufficient to float graphene over the magnetic structure. The graphene generation chamber generates graphene from said ring structures over the magnetic structure such that the graphene floats over the magnetic structure due to said graphene being diamagnetic. The rate at which the ring structures are produced is controlled to control the rate of graphene generation. The magnetic field of the magnetic structure can be controlled to control the rate at which the generated graphene moves through the graphene generation chamber until it exits as a recovered graphene product.

20 Claims, 9 Drawing Sheets

Related U.S. Application Data application No. 13/317,280, filed on Oct. 13, 2011, now Pat. No. 9,210,263.

(60) Provisional application No. 62/060,972, filed on Oct. 7, 2014, provisional application No. 61/455,211, filed on Oct. 15, 2010, provisional application No. 62/025,691, filed on Jul. 17, 2014.

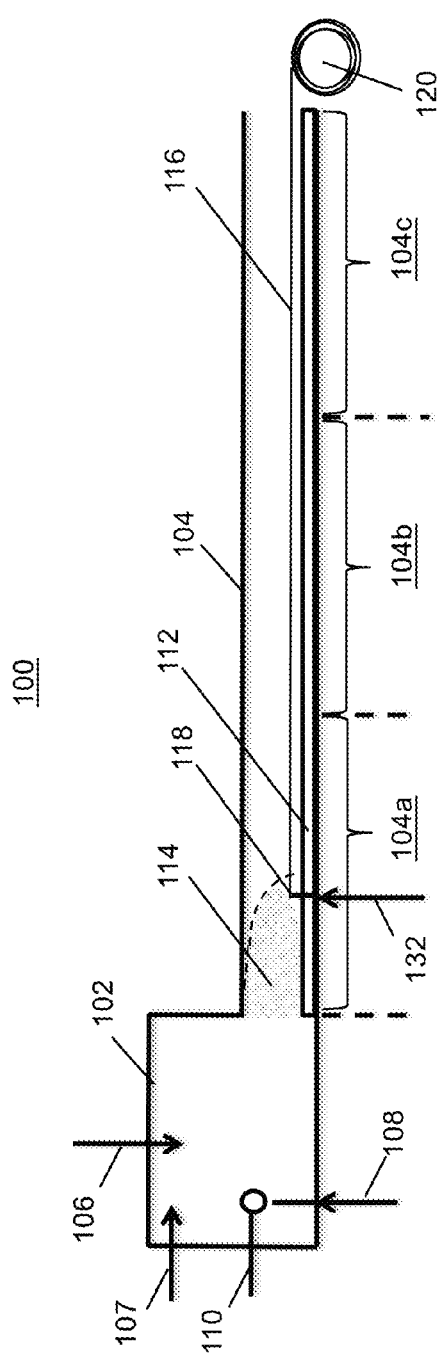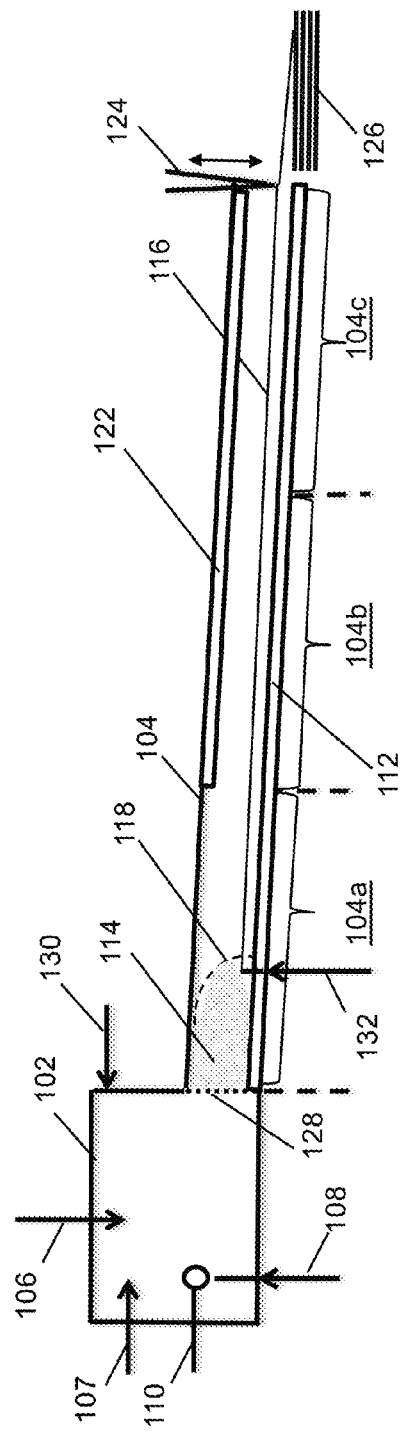

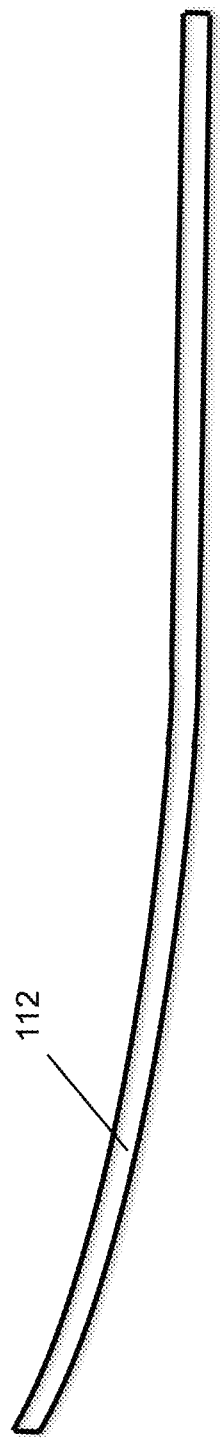

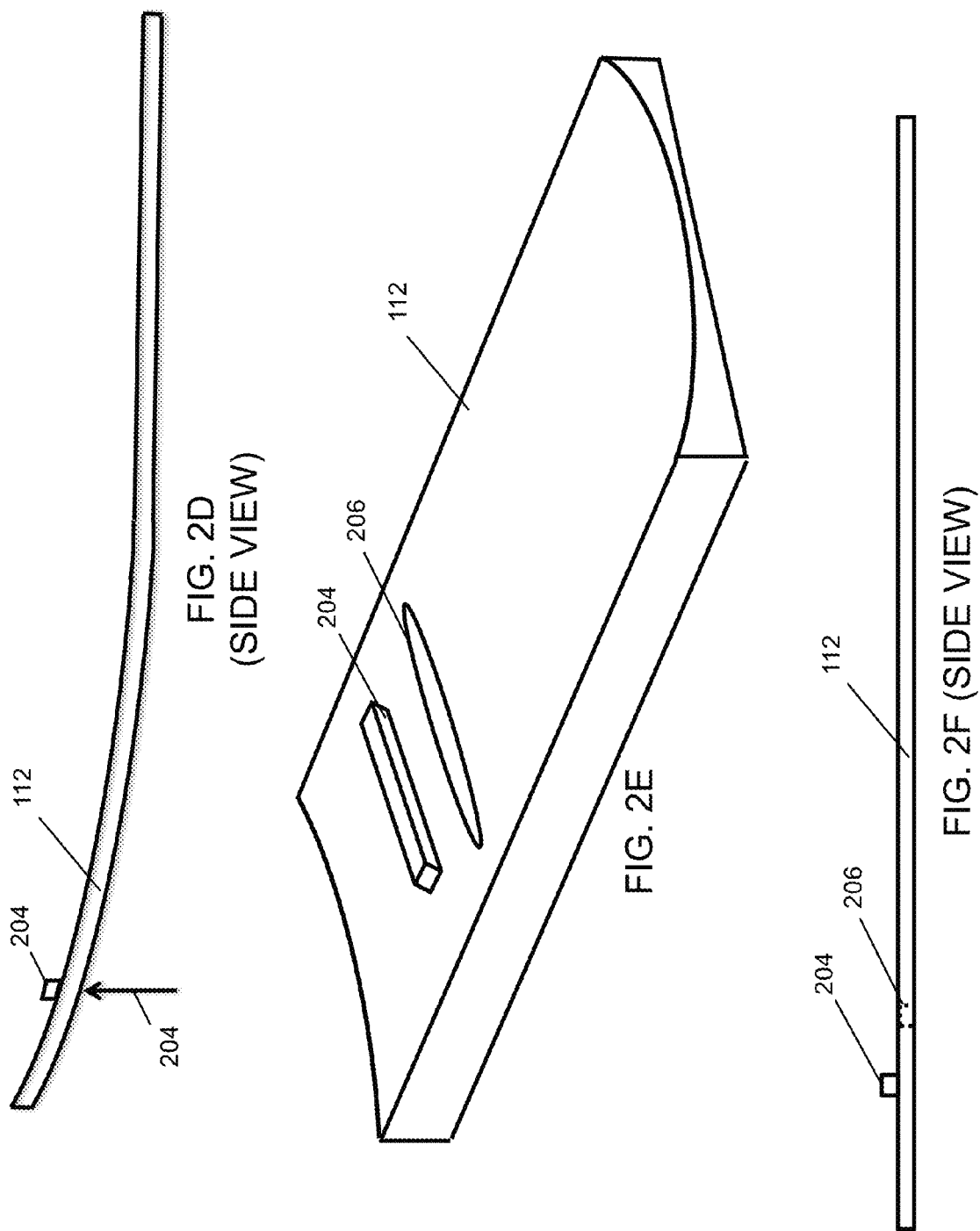

(TOP VIEW)

(TOP VIEW)

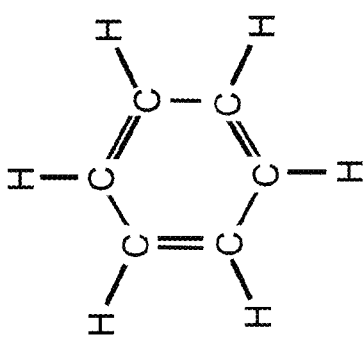
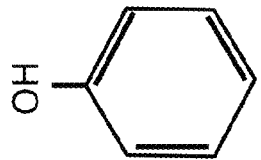
304
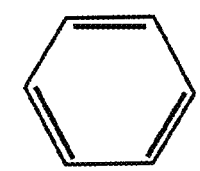
FIG. 3C
(TOP VIEW)
306
FIG. 3E
(TOP VIEW)
304
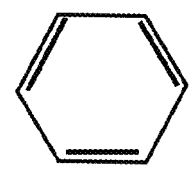
304
FIG. 3D
(TOP VIEW)

SYSTEM FOR PRODUCING GRAPHENE IN A MAGNETIC FIELD

CROSS-REFERENCE TO RELATED APPLICATIONS

This Non-Provisional application is a continuation-in-part of Non-provisional application Ser. No. 14/799,676, filed Jul. 15, 2015, which is a continuation-in-part of Non-provisional application Ser. No. 14/275,267, filed May 12, 2014, which is a continuation-in-part of U.S. Pat. No. 8,721,843, issued May 13, 2014, which claims the benefit under 35 USC 119(e) of Provisional Application No. 61/455,211, filed Oct. 15, 2010 by Fullerton et al., titled "System and Method for Producing Graphene".

This Non-Provisional application claims the benefit under 35 USC 119(e) of Provisional Application No. 62/060,972, filed Oct. 7, 2014 by Fullerton et al., titled "System for Producing Graphene in a Magnetic Field".

These applications are hereby incorporated by reference herein in their entirety.

FIELD OF THE INVENTION

The present invention relates generally to a system for generating a continuous graphene film. More particularly, the present invention relates to a system for producing grapheme using a continuous manufacturing web process whereby chemical reaction produces ring structures having starved carbon atoms at a desired rate allowing the continuous growth of a graphene film floating over a magnetic field.

BACKGROUND OF THE INVENTION

Current systems and methods for producing graphene film such as using tape to remove a layer of graphene from graphite are generally ad hoc and uncontrollable. It is therefore desirable to have an improved system and method for producing graphene of sufficient quality and quantity for commercial purposes.

SUMMARY OF THE INVENTION

The present invention is an improved system for generating graphene by floating graphene as it is generated over a magnetic field. In accordance with one embodiment of the invention, a system for generating graphene comprises a liquid reaction chamber configured to receive a working liquid source, a carbon atom source, and a catalyst to cause a chemical reaction in the reaction chamber and a resulting reactant liquid comprising ring structures having starved carbon atoms; a graphene generation chamber coupled to the liquid reaction chamber and configured to receive the resulting reactant liquid as it exits the liquid reaction chamber, the graphene generation chamber being configured to generate a graphene film from the ring structures as part of a polymerization process. The graphene generation chamber includes a growth portion; a recovery portion; and a magnetic structure comprising a two-dimensional array of alternating polarity magnetic sources, the magnetic structure producing a magnetic field having a magnetic field gradient sufficient to float the graphene film over the magnetic structure, the magnetic structure extending from the growth portion to the recovery portion; and a graphene seed source configured to provide a graphene seed to an initial location over the magnetic field within the growth portion of the graphene generation chamber, the graphene film being generated over the magnetic field such that the graphene film floats over the magnetic field due to the graphene film being diamagnetic, the ring structures causing the floating graphene film to grow continuously from the initial location, the graphene generation chamber being configured such that the floating graphene film moves away from the initial location and through the graphene generation chamber until it exits the recovery portion of the graphene generation chamber as a recovered graphene product.

The working liquid source may include an inert solvent.

The ring structures may have six starved carbon atoms.

The carbon atom source may comprise Acetylene.

The catalyst may comprise Palladium.

The carbon atom source may comprise aromatic rings, which may include at least one of Toluene, Xylene, Aniline, Phenol, Benzoic Acid, Styrene, Benzaldehyde, Amygdalin, Hyuacinthin, Cinnamaldehyde, Anethole, Benzyl Acetate, or Phenylethanol.

The carbon atom source may comprise polycyclic aromatic rings, which may include at least one of Naphtalene, Anthracene, Phenanthrene, ortho-Phenanthroline, Dibenzanthrancene, Pyrene, or Benzopyrene.

The magnetic structure may comprise permanent magnetic material, which can be magnetized such that the magnetic field strength of the magnetic field is strongest near the initial location of the graphene seed and the magnetic strength of the magnetic field becomes progressively weaker until it is weakest near the end of the recovery portion of the graphene generation chamber.

The magnetic structure may comprise one of electromagnets or electro-permanent magnets.

The system can include at least one laser for trimming the graphene film.

The graphene generation chamber may also have a second magnetic structure above the graphene.

The outer edges of the magnetic field along its length can exhibit stronger field strengths than the center portion of the magnetic field.

The system can include a barrier magnetic field source.

The graphene generation chamber may include a processing portion between the growth portion and the recovery portion of the graphene generation chamber for processing the graphene film, where the processing comprises one of lasers drawing conductive traces, applying other atoms using stereo lithography, activating carbon, or mixing impurities.\

The chemical reaction may comprise one of decarboxylation of sodium benzoate, heating phenol with zinc, polymerization of ethyne (acetylene) using a hot copper tube, reduction of benzene diazonium chloride, and hydrolysis of sulphonic acid.

The ring structures may comprise at least one of Benzene molecules, Buckminsterfullerene molecules, or Fullerene molecules.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1A depicts an exemplary graphene production system;

FIG. 1B depicts another exemplary graphene production system;

FIG. 2A depicts a cross section across the width of an exemplary bowl-shaped magnetic structure;

FIG. 2B depicts a cross section across the width of an exemplary bowl-shaped magnetic field of a magnetic structure;

FIG. 2C depicts a side view of the length of an exemplary magnetic structure having a slope that decreases as the graphene film moves through the graphene generation chamber;

FIGS. 2D and 2E depict an exemplary magnetic structure like that of FIG. 2C that has an exemplary barrier magnetic field;

FIG. 2F depicts an exemplary magnetic structure like that of FIG. 1C having an exemplary barrier magnetic field and an exemplary liquid drain;

FIG. 3C depicts and exemplary Benzene molecule;

FIG. 3D depicts an exemplary representation of the resonance characteristic of the Benzene molecule where the single bonds and double bonds resonate between the two states shown;

FIG. 3E depicts an exemplary Phenol molecule;

DETAILED DESCRIPTION OF THE INVENTION

Figure 1C:
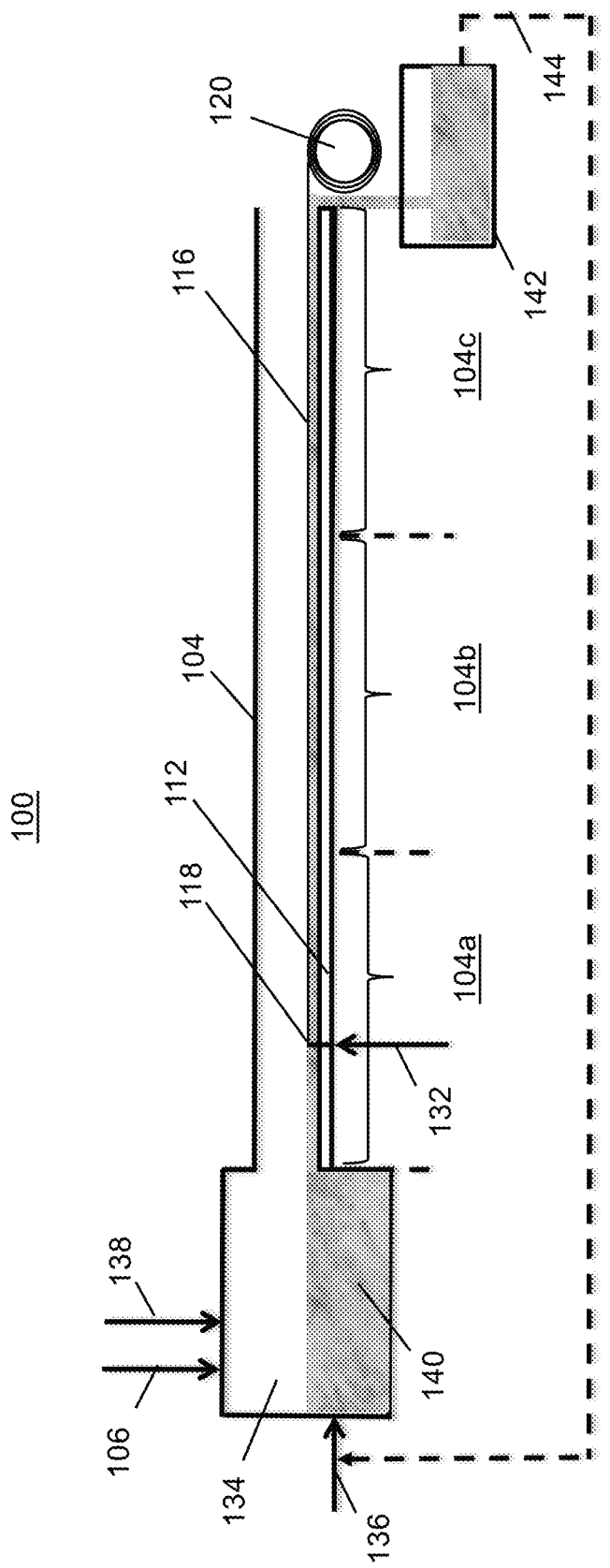
FIG. 1C depict yet another exemplary graphene production system.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The present invention provides an improved system and method for producing graphene from a source of ionized carbon atoms by generating graphene from the ionized carbon atoms over a magnetic structure such that the generated graphene floats over the magnetic structure.

FIG. 1A depicts an exemplary graphene production system 100 including a plasma generation chamber 102 and a graphene generation chamber 104. The plasma generation chamber 102 may be a so-called hot plasma generation chamber, a so-called cold plasma generation chamber, or a plasma generation chamber that produces plasma at any desired temperature. The graphene generation chamber 104 may have multiple subchambers including a growth portion 104a, one or more optional processing portions 104b, and at least one recovery portion 104c. A carbon atom source 106, for example methane ($CH_4$), an inert gas 107, such as helium, argon, krypton, neon or xenon, and an ionizing energy source 108, for example a radio frequency (RF) or high voltage (HV) source, are provided to the plasma generation chamber 102, whereby a pressure control system 110 (e.g., a vacuum pump) is used to produce an absolute pressure within the plasma generation chamber 102 necessary to achieve a mean free path of molecules between collisions sufficient to produce a glow discharge and an even plasma distribution within the plasma generation chamber 102. A resulting carbon atom cloud 114 exiting the plasma generation chamber 102 causes a graphene film 116 to grow continuously from a location of a graphene seed 118 provided by a graphene seed source 132 and introduced into the graphene generation chamber 104. The continuously growing graphene film 116, which is diamagnetic, floats over a magnetic structure 112 and moves through the graphene production chamber until it exits the graphene generation chamber 104 as a recovered graphene product, for example, a roll of graphene 120.

One skilled in the art will recognize that many different types of carbon atom sources could be used with the invention such as $CH_4CO_2$, CO, and the like. In a preferred embodiment, the carbon atom source would have only one carbon atom to simplify the stripping of the atom. One skilled in the art will also recognize that various ionizing energy sources could be used, for example, a 2.4 Ghz (microwave) signal. Furthermore, one skilled in the art will recognize that various graphene seed sources could be used such as a highly ordered pyrolytic graphite (HOPG) source, where any one of various types of automated, semi-automated, or manual methods can be employed to provide a graphene seed 118 from the graphene seed source 132 at a desired location in the graphene generation chamber 104.

As shown in FIG. 1A, the graphene film 116 may be pulled down the graphene generation chamber 104 as a result of a rolling process used to produce the roll of graphene 120, whereby a control system (not shown) controls the turning rate of the roll of graphene 120 to correspond to the rate of growth of the graphene film 116. The control system also controls the rate of growth of the graphene film 116 by controlling the ratio of the carbon atom source 106 to the inert gas 107, the absolute pressure within the chamber 102, and the energy density inside the chamber resulting from the ionizing energy source 108 and thus the glow discharge and plasma distribution in the plasma generation chamber 102. Generally, a control system can be a closed loop control system involving sensors and the like to measure the parameters of the system 100 being controlled.

In one alternative arrangement, an atomic beam of carbon can be accelerated in a conventional manner and then focused using electric and/or magnetic lensing. Furthermore, it can be passed through an inhomogeneous magnetic field acting in a manner similar to a spectrometer to enable separation (e.g., for atomic species and isotopic purification purposes) of different atoms to make an isotropically pure source beam (of carbon atoms) thereby resulting in a specific graphene composition.

In still another alternative arrangement, atomic beams could be used to interlace other types of atoms on the growth edge of the graphene film to produce composite materials much like weaving a blanket. Similarly, television raster technique might be employed. Many such similar techniques are possible as long as enough graphene is included in such composite materials whereby the graphene portion of the material will enable it to float above the magnetic structure and thereby move through and exit the graphene generation chamber as would a graphene-only film.

In yet still another alternative arrangement, the generated graphene film is merely a binder included to cause any other material of interest to be processed via the invention such that it floats through the graphene generation chamber.

One or more processing portions 104b may reside between the growth portion 104a and the recovery portion 104c of the graphene generation chamber 104. Various types of processing of the graphene film 116 are possible including, for example, lasers drawing conductive circuit board traces, applying other atoms using stereo lithography to build nanostructures and nanomachines, activating carbon and mixing impurities to produce semiconductors, etc.

Under one arrangement, the magnetic structure 112 is made up of multiple sources of permanent magnetic material magnetized such that the magnetic field strength of the sources of the magnetic structure 112 are strongest near the location of the graphene seed 118 and the magnetic strength of the sources of the magnetic structure 112 become progressively weaker until they are weakest near the end of the recovery portion 104c of the graphene generation chamber 104 causing a downward slope of the graphene film 116 that causes gravitational forces to move the graphene film through and exit the graphene generation chamber 104. Under another arrangement the magnetic structure 112 comprises electromagnets or electro-permanent magnets whereby the magnetic field strength along the magnetic structure 112 is varied to cause gravitational forces to move the graphene film 116 through and exit the graphene generation chamber 104. Under still arrangement, the control system varies the slope of graphene film 116 by controlling the magnetic field strength along the magnetic structure 112 so as to control (i.e., speed up or slow down) the rate at which the graphene film 116 moves through and exits the graphene generation chamber 104. Under yet another arrangement, one or more slopes of one or more parts of the magnetic structure 112 are mechanically controlled by the control system so as to control the effect of gravitational forces and thereby the rate at which the graphene film 116 moves through and exits the graphene generation chamber 104.

FIG. 1B depicts another exemplary graphene production system 100, which is similar to the graphene production system of FIG. 1A except the graphene generation chamber is slanted so that gravitational forces can be used to cause the graphite film to move through and exit the graphene generation chamber 104. The intent of this curvature is to create negative feedback to prevent the film from progressing backward into the ionization chamber. Other variations to the system 100 include a second magnetic structure 122, which could be used to control the height of the graphene film 116 particularly during processing but also during other portions of the chamber 104 such as within a recovery portion 104c. As depicted, a cutting mechanism 124 cuts the graphene film 116 into a recovered graphene product, for example, a stack of graphene films 126.

Also shown in FIG. 1B is an optional shield 128 used to prevent the ionization energy source from exiting the plasma generation chamber 102 and entering the graphene growth chamber 104. Alternatively, the opening between the plasma generation chamber 102 and the graphene growth chamber 104 can be selected based on waveguide cutoff properties to not allow signals. An optional getter 130 is also depicted, which can be used to remove atomic hydrogen from the plasma generation chamber 102.

FIG. 1C depicts yet another exemplary graphene production system 100, which is similar to the graphene production systems of FIGS. 1A and 1B except the plasma generation chamber 102 is replaced by a liquid reaction chamber 134, where instead of producing a carbon atom cloud to provide carbon atoms to a graphene sheet, graphene is produced as part of a polymerization process (i.e., adding carbon atoms from a chemical species onto the edge of a graphene sheet). In other words, a chemical reaction in the liquid reaction chamber 134 results in a chemical synthesis of monomer molecules to form graphene polymer chains. The liquid reaction chamber receives a working liquid, e.g., an inert solvent, from a working liquid source 136, receives a carbon atom source 106, for example Acetylene, and receives a catalyst 138, for example Palladium. A chemical reaction is produced in the reaction chamber 134, which strips off hydrogen atoms or other atoms to produce a resulting reactant liquid 140 having ring structures, for example Benzene ring structures, with six starved carbon atoms that can attach to and grow a graphene film 116 above the magnetic field structure 112. The reactant liquid 140 is provided to the graphene source 118 such that the ring structures can attach to the graphene film 116 and the remaining reactant liquid 140 can then travel through and exit the end of the graphene generation chamber 104 into a recovery reservoir 142. An optional liquid recycling conduit 144 is shown between recovery reservoir 142 and working liquid source 136 to represent that liquid recovered in the recovery reservoir 142 can be recycled into the working liquid source 136 in accordance with the invention.

There are various ring structures having an available carbon bond such as Benzene molecules or some other related ring structure such as Buckminsterfullerene ($C_{60}$) or Fullerene ($C_{70}$) molecules. Various hydrocarbons containing Benzene ring structures can be used as a carbon atom source 106, such as certain aromatic rings (or aromatic compounds or arenes) or polycyclic aromatic rings. Examples of aromatic rings include Toluene, Xylene, Aniline, Phenol, Benzoic Acid, Styrene, Benzaldehyde, Amygdalin, Hyuacinthin, Cinnamaldehyde, Anethole, Benzyl Acetate, and Phenylethanol. Examples of polycyclic aromatic rings include Naphtalene, Anthracene, Phenanthrene, ortho-Phenanthroline, Dibenzanthrancene, Pyrene, and Benzopyrene. A useful resource regarding polycyclic aromatic hydrocarbons (PAHs) can be found at http://www.env.gov.bc.ca/wat/wq/BCguidelines/pahs/pahs-01.htm, which is incorporated by reference herein in its entirety. Another resource regarding PAHs can be found at http://en.wikipedia.org/wiki/Polycyclic_aromatic_hydrocarbon, which is incorporated by reference herein in its entirety.

There are many different chemical reactions possible for removing outlier carbon atoms from various carbon atom sources to produce ring structures that can attach to a graphene seed or graphene sheet. One approach that forms Benzene from Acetylene using Palladium as a catalyst is described in "On the Reaction Pathway for the Formation of Benzene from Acetylene Catalyzed by Palladium", "Catalyst Letters", 07-1999, Volume 60, Issue 1-2, pp 11-14, which is incorporated herein by reference in its entirety.

The Chem-Guide blog found at http://chem-guide.blogspot.com/2010/04/preparation-of-benzene.html, which is incorporated by reference herein in its entirety, describes five different chemical reactions for producing Benzene rings including decarboxylation of sodium benzoate, heating phenol with zinc, polymerization of ethyne (acetylene) using a hot copper tube, reduction of benzene diazonium chloride, and hydrolysis of sulphonic acid.

The Handbook of Advanced Electronic and Photonic Materials and Devices includes a Chapter 3 titled "Polyacetylene and Its Analogs: Synthesis and Physical Properties", which is incorporated by reference herein in its entirety, that describes various chemical reactions for polymerization of Acetylene.

Another example chemical reaction synthesis that uses acetylene as a carbon atom source and that uses platinum as a catalyst can be found at http://archives.library.illinois.edu/erec/University%20Archives/1505050/Organic/Alkenes/Chapter%/203/sec3-2/3-2.htm, which is incorporated herein by reference in its entirety.

One skilled in the art will recognize that magnetization techniques can be employed to produce magnetic field characteristics for the magnetic structure 112 (and optionally the second magnetic structure 122) that assist in controlling movement and also growth characteristics of the graphene film 116. For example, the outer edges of the magnetic structure 112 along its length could exhibit stronger field strengths than the center portion so that the graphene film could be more easily maintained within the boundaries of the magnetic structure 112. FIG. 2A depicts a cross section of an exemplary bowl-shaped magnetic structure 112, which could alternatively be a bowl-shaped magnetic field 202 of a magnetic structure 112 such as shown in FIG. 2B. FIG. 2C depicts a side view of the length of an exemplary magnetic structure 112 having a slope that decreases as the graphene film 116 moves through the graphene generation chamber 104. Such a design is intended to support initial production of a graphene film 116 from a seed 118 so as to prevent the seed from growing towards the plasma generation chamber 102. FIGS. 2D and 2E depict an exemplary magnetic structure 112 like that of FIG. 2C that has a barrier magnetic field 204 produced by a barrier magnetic field source 206. The barrier magnetic field 204 may be used to prevent or limit movement of the graphene film 116 down the magnetic structure 112 such as during the initial stage of graphene film growth, where it may be desirable that the graphene seed 118 be stationary or substantially stationary. FIG. 2E also depicts an optional drain 206, which can be used with a graphene production system such as depicted in FIG. 1C, where the reactant liquid 140 can be drained into a reactant reservoir 142 without having to travel through and exit the entire graphene generation chamber 104. The drain is shown being in the middle of the magnetic field structure 112 but could alternatively be configured such that the reactant fluid 140 is drained down one or both sides of the magnetic field structure 112, which could be effected using a dam-like structure slightly below the floating graphene film 116.

Although the exemplary reactant liquid 140 of FIG. 1C is depicted having a surface that appears to be parallel to the exemplary magnetic field structure 112, this depiction is not intended to limit the invention. Instead, various techniques can be used to vary characteristics (e.g., depth, height, flow rate, etc.) of the reactant liquid 140 as desired to control the chemical reaction, to control the growth of the graphene film 116, and/or to control the removal of the reactant liquid 140 from the graphene generation chamber 104. For example, mechanisms which affect the reactant liquid 140 such as pumps or other devices that effect flow or movement of the reactant liquid 140 can be used in conjunction with or independent of magnetic characteristics of magnetic fields present in the system, for example, magnetic fields of the magnetic structure 112 or of the barrier magnetic field 204.

FIG. 2F depicts a side view of an exemplary magnetic structure 112 like that shown in FIG. 1C, which includes a barrier magnetic field 204 and a drain 206.

One skilled in the art will recognize that various types of barrier magnetic fields 204 can be employed having various magnetic field shapes, which can be produced using electromagnets and/or permanent magnets, where a barrier magnetic field can be reduced or removed or otherwise varied so as to control or prevent movement of a graphene film 116.

Figure 3B:
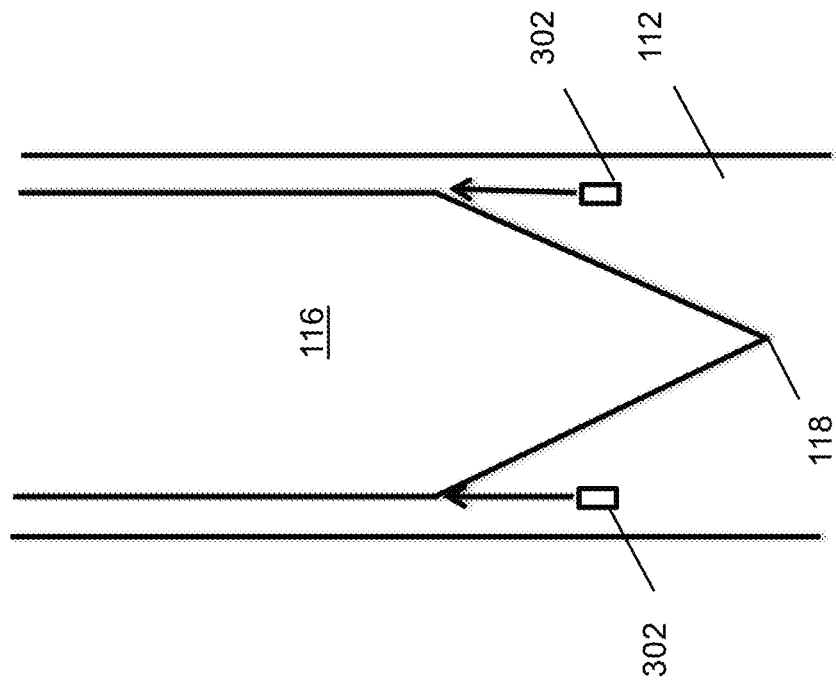
FIG. 3B depicts a top view of the growth of the graphene film from a location that a seed was introduced, where the graphene film is moving away from the location and floating above the magnetic structure of the graphene generation chamber.
Figure 3A:
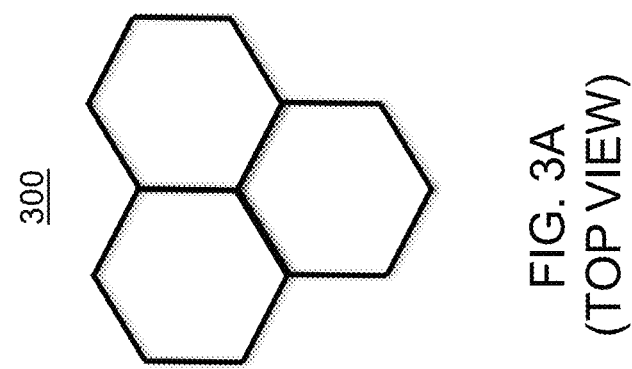
FIG. 3A depicts an exemplary graphene seed.

FIG. 3A depicts an exemplary graphene seed 300.

FIG. 3B depicts a top view of growth of the graphene film 116 from a location 118 that a seed was introduced into the graphene generation chamber 104, where the graphene film 116 is moving away from the location 118 and floating above the magnetic structure 112 of the graphene generation chamber 104. As shown, lasers 302 can be used to trim the graphene film 116 once outside the growth portion 104a of the graphene generation chamber 104 so as to achieve a desired shape. Eventually the growth edge will approach the shape of a flat growth edge.

FIG. 3C depicts and exemplary Benzene molecule 304.

FIG. 3D depicts an exemplary representation of the resonance characteristic of the Benzene molecule where the single bonds and double bonds resonate between the two states shown.

FIG. 3E depicts an exemplary Phenol molecule 306.

One skilled in the art will recognize that various geometries for the graphene are possible such as carbon fiber nanotubes having different spiral (tilt) angles and the like where the seed has a desired number of atoms and atom tile along a cylinder. One skilled in the art will also recognize that different types of atoms such as boron can be used in place of carbon atoms in accordance with the invention. One skilled in the art will recognize that the seed may be initially oriented to produce a film whose hexagonal structure is grown at a preferred angle.

Figure 4:
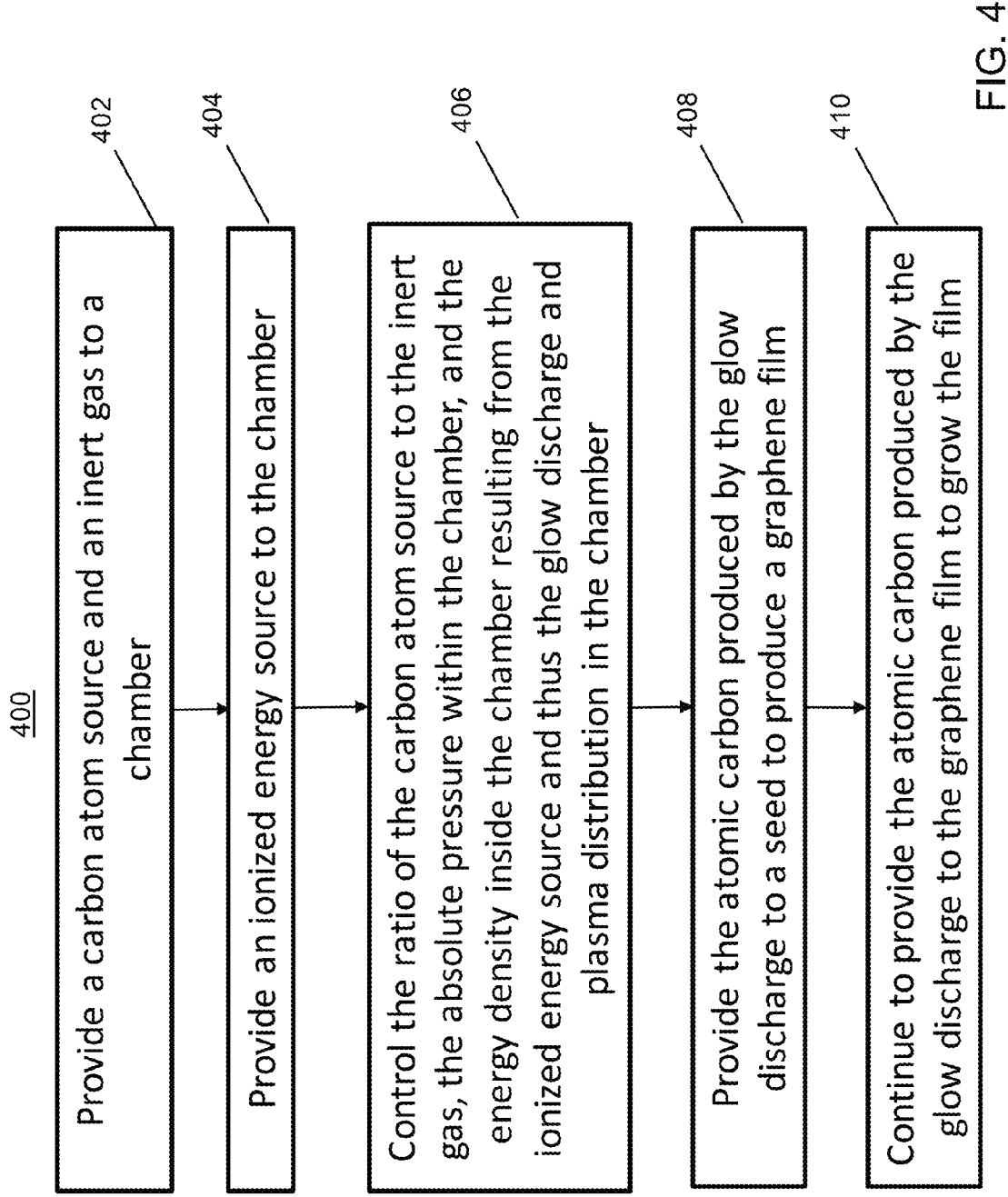
FIG. 4 depicts an exemplary method in accordance with the invention.

FIG. 4 depicts an exemplary method 400 in accordance with the invention. The method 400 includes five steps. The first step 402 is to provide a carbon atom source and an inert gas to a chamber. The second step 404 is to provide an ionizing energy source to the chamber. The third step 406 is to control the ratio of the carbon atom source to the inert gas, the absolute pressure within the chamber, and the energy density inside the chamber resulting from the ionizing energy source and thus the glow discharge and plasma distribution in the chamber. The fourth step 408 is to provide the ionized atomic carbon produced by the glow discharge to a seed to produce a graphene film and the fifth step 410 is to continue to provide the atomic carbon produced by the glow discharge to the graphene film to grow the film.

Figure 5:
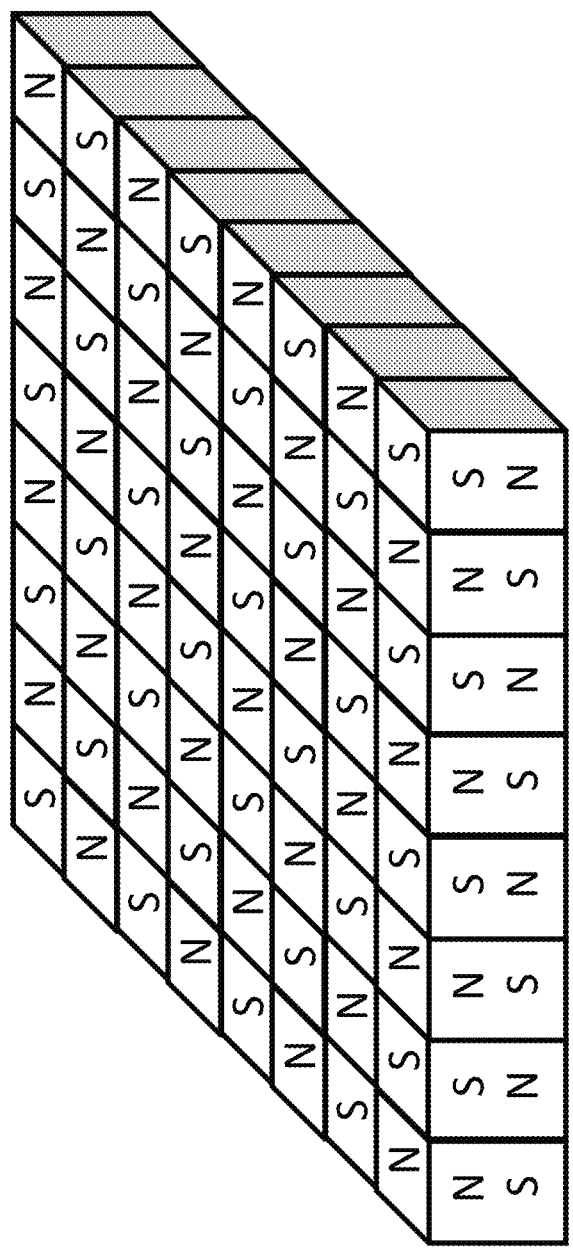
FIG. 5 depicts an exemplary magnetic structure in accordance with the invention.

In accordance with one aspect of the invention the magnetic field structure is constructed to produce a sharp magnetic field gradient sufficient to float the graphene film. Under one arrangement a sharp magnetic field gradient is produced by using an alternating polarity pattern of magnetic field sources. FIG. 5 depicts an exemplary magnetic structure comprising a grid array of alternating polarity magnetic sources, which could be discrete magnets or magnetic sources magnetized into a magnetizable material. Under one arrangement the size of each magnetic source, or magnetic grid spacing, is on the order of 75% of the smallest dimension of the graphene sheet being levitated, or smaller. Under another arrangement the graphene seed used to start the process will be approximately 125% of the magnet grid spacing or larger. Smaller seeds may be used but must be mechanically supported until they are edge grown large enough to exceed the magnetic grid spacing used. At that point the seed will be disconnected and the graphene film and will be supported entirely by the magnet grid (i.e., it will float above the grid).

A very small, or fine, magnet grid spacing may be employed for the purpose of supporting the seed, with the remaining grid having a coarser grid that is sufficient to support the manufactured film.

In accordance with another aspect, the magnetic field sources making up the magnetic structure could have shapes other than a flat surface that interacts with the graphene film. For example, the magnets might be rounded, a cone shape, or even a pointed portion.

In accordance with another aspect of the invention, each magnetic source would have associated with it a pole piece that might have a flat portion that interacts with the magnetic source where the opposing end of the pole piece narrows to a point that is directed towards the graphene film. As such, the graphene film would experience an enhanced gradient resulting from the pole pieces concentrating the field from the surface of each magnetic source.

In accordance with yet another aspect of the invention, a graphene seed or an initial graphene film portion, is placed upon a pedestal associated with the magnetic structure, where the pedestal is used to support the seed or film portion until sufficient growth increases its size such that the resulting graphene film will float above the magnetic structure. The pedestal may be round, e.g., shaped much like sphere, or may be a group of pointed objects intended to hold up the seed/film. Under one arrangement the pedestal could be produced using multiple pole pieces that focus the magnetic fields produced from multiple magnetic sources to a physically smaller array having a grid spacing smaller than the magnetic grid array.

Figure 6:
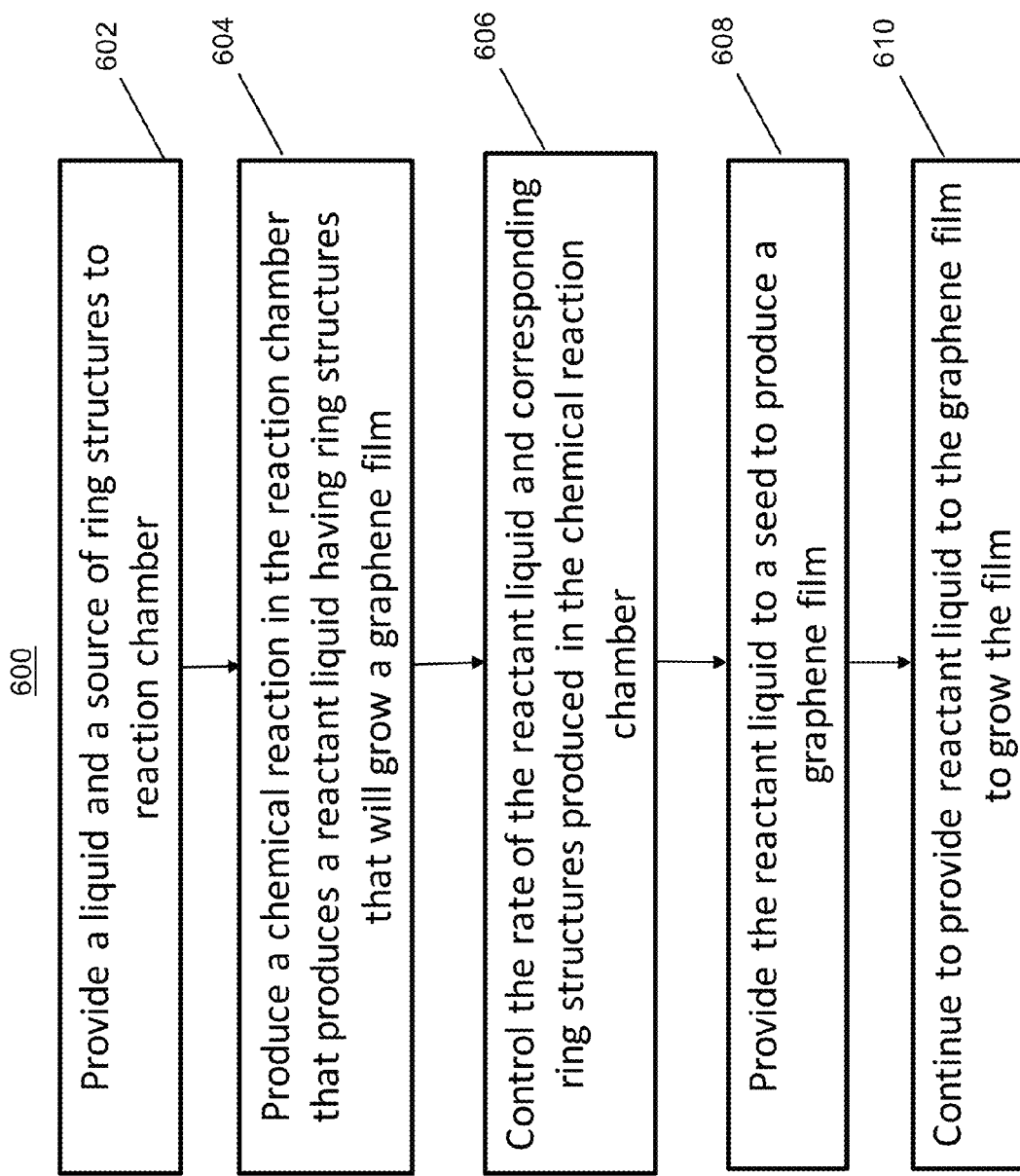
FIG. 6 depicts another exemplary method in accordance with the invention.

FIG. 6 depicts an exemplary method 600 in accordance with the invention. The method 600 includes five steps. The first step 602 is to provide a liquid and a source of ring structures to a reaction chamber. The second step 604 is to produce a chemical reaction in the chamber that produces a reactant liquid having ring structures that will grow a graphene film. The third step 606 is to control the rate of the reactant liquid and corresponding ring structures produced in the chemical reaction chamber. The fourth step 608 is to provide the reactant liquid to a seed to produce a graphene film and the fifth step 610 is to continue to provide the reactant liquid to the graphene film to grow the film.

While particular embodiments of the invention have been described, it will be understood, however, that the invention is not limited thereto, since modifications may be made by those skilled in the art, particularly in light of the foregoing teachings.

The invention claimed is:

1. A system for generating graphene in a magnetic field, comprising:
   a liquid reaction chamber configured to receive a working liquid source, a carbon atom source, and a catalyst to cause a chemical reaction in the reaction chamber and a resulting reactant liquid comprising ring structures having starved carbon atoms;
   a graphene generation chamber coupled to said liquid reaction chamber and configured to receive said resulting reactant liquid as it exits said liquid reaction chamber, said graphene generation chamber being configured to generate a graphene film from said ring structures as part of a polymerization process, said graphene generation chamber comprising:
      a growth portion;
      a recovery portion; and
      a magnetic structure comprising a two-dimensional array of alternating polarity magnetic sources, said magnetic structure producing a magnetic field having a magnetic field gradient sufficient to float the graphene film over said magnetic structure, said magnetic structure extending from said growth portion to said recovery portion; and
   a graphene seed source configured to provide a graphene seed to an initial location over said magnetic field within said growth portion of said graphene generation chamber, said graphene film being generated over said magnetic field such that said graphene film floats over said magnetic field due to said graphene film being diamagnetic, said ring structures causing said floating graphene film to grow continuously from said initial location, said graphene generation chamber being configured such that the floating graphene film moves away from said initial location and through said graphene generation chamber until it exits said recovery portion of said graphene generation chamber as a recovered graphene product.

2. The system of claim 1, wherein said working liquid source comprises an inert solvent.

3. The system of claim 1, wherein ring structures have six starved carbon atoms.

4. The system of claim 1, wherein said carbon atom source comprises Acetylene.

5. The system of claim 1, wherein said catalyst comprises Palladium.

6. The system of claim 1, wherein said carbon atom source comprises aromatic rings.

7. The system of claim 6, wherein said aromatic rings comprises at least one of Toluene, Xylene, Aniline, Phenol, Benzoic Acid, Styrene, Benzaldehyde, Amygdalin, Hyuacinthin, Cinnamaldehyde, Anethole, Benzyl Acetate, or Phenylethanol.

8. The system of claim 1, wherein said carbon atom source comprises polycyclic aromatic rings.

9. The system of claim 8, wherein said polycyclic aromatic rings comprises at least one of Naphtalene, Anthracene, Phenanthrene, ortho-Phenanthroline, Dibenzanthrancene, Pyrene, or Benzopyrene.

10. The system of claim 1, wherein said magnetic structure comprises permanent magnetic material.

11. The system of claim 10, wherein said permanent magnetic material is magnetized such that the magnetic field strength of the magnetic field is strongest near the initial location of the graphene seed and the magnetic field strength of the magnetic field becomes progressively weaker until it is weakest near an end of said recovery portion of said graphene generation chamber.

12. The system of claim 1, wherein said magnetic structure comprises one of electromagnets or electro-permanent magnets.

13. The system of claim 1, further comprising:
   at least one laser for trimming said graphene film.

14. The system of claim 1, said graphene generation chamber further comprising:
   a second magnetic structure above said graphene.

15. The system of claim 1, wherein outer edges of said magnetic field along its length exhibit stronger field strengths than a center portion of said magnetic field.

16. The system of claim 1, further comprising:
   a barrier magnetic field source.

17. The system of claim 1, said graphene generation chamber further comprising:
   a processing portion between said growth portion and said recovery portion of said graphene generation chamber for processing said graphene film.

18. The system of claim 17, wherein said processing comprises one of lasers drawing conductive traces, applying other atoms using stereo lithography, activating carbon, or mixing impurities.

19. The system of claim 1, wherein said chemical reaction comprises one of decarboxylation of sodium benzoate, heating phenol with zinc, polymerization of ethyne (acetylene)

using a hot copper tube, reduction of benzene diazonium chloride, and hydrolysis of sulphonic acid.

20. The system of claim 1, wherein said ring structures comprise at least one of Benzene molecules, Buckminsterfullerene molecules, or Fullerene molecules.

* * * * *